(12) United States Patent
Johansson et al.

(10) Patent No.: US 11,021,030 B2
(45) Date of Patent: Jun. 1, 2021

(54) AIR SUSPENSION ARRANGEMENT

(71) Applicant: VOLVO TRUCK CORPORATION, Gothenburg (SE)

(72) Inventors: Per Johansson, Gothenburg (SE); Thomas Andersson, Onsala (SE)

(73) Assignee: VOLVO TRUCK CORPORATION, Gothenburg (SE)

(*) Notice: Subject to any disclaimer, the term of this patent is extended or adjusted under 35 U.S.C. 154(b) by 246 days.

(21) Appl. No.: 16/094,019

(22) PCT Filed: Apr. 19, 2016

(86) PCT No.: PCT/EP2016/058664
§ 371 (c)(1),
(2) Date: Oct. 16, 2018

(87) PCT Pub. No.: WO2017/182060
PCT Pub. Date: Oct. 26, 2017

(65) Prior Publication Data
US 2019/0126707 A1 May 2, 2019

(51) Int. Cl.
*B60G 11/27* (2006.01)
*B60G 11/62* (2006.01)
(Continued)

(52) U.S. Cl.
CPC ............... *B60G 11/27* (2013.01); *B60G 7/04* (2013.01); *B60G 11/28* (2013.01); *F16F 9/0454* (2013.01);
(Continued)

(58) Field of Classification Search
CPC .......... B60G 7/04; B60G 11/27; B60G 11/28; B60G 11/62; B60G 2204/126;
(Continued)

(56) References Cited

U.S. PATENT DOCUMENTS

| 4,798,369 A | * | 1/1989 | Geno | ............... B60G 17/01933 188/266.2 |
| 5,941,510 A | * | 8/1999 | Grass | ....................... B60G 7/04 267/64.27 |

(Continued)

FOREIGN PATENT DOCUMENTS

| DE | 3934821 A1 | 4/1991 |
| DE | 20023582 U1 | 12/2004 |

(Continued)

OTHER PUBLICATIONS

International Search Report dated (Jan. 13, 2017) for corresponding International App. PCT/EP2016/058664.

*Primary Examiner* — Barry Gooden, Jr.
(74) *Attorney, Agent, or Firm* — Withrow & Terranova PLLC

(57) ABSTRACT

An air suspension arrangement arranged to be connected between a vehicle axle and a vehicle chassis of a vehicle includes a flexible bellows having an upper portion connectable to the vehicle chassis of the vehicle, and a bumper stop, wherein the air suspension arrangement further includes a polymer member arranged between the bumper stop and the flexible bellows for connecting the bumper stop to the flexible bellows. A method for manufacturing the air suspension arrangement and a vehicle including such an air suspension arrangement are also provided.

16 Claims, 5 Drawing Sheets

(51) Int. Cl.
*F16F 9/05* (2006.01)
*B60G 11/28* (2006.01)
*F16F 9/04* (2006.01)
*B60G 7/04* (2006.01)

(52) U.S. Cl.
CPC ............ *F16F 9/05* (2013.01); *F16F 9/052* (2013.01); *B60G 2202/143* (2013.01); *B60G 2202/152* (2013.01); *B60G 2204/126* (2013.01); *B60G 2204/4502* (2013.01); *B60G 2206/424* (2013.01); *B60G 2206/73* (2013.01); *B60G 2206/82* (2013.01)

(58) Field of Classification Search
CPC ...... B60G 2204/4502; B60G 2206/424; B60G 2206/82; F16F 9/0445; F16F 9/0454; F16F 9/0472; F16F 9/05; F16F 9/052; F16F 9/057
See application file for complete search history.

(56) References Cited

U.S. PATENT DOCUMENTS

| | | | | |
|---|---|---|---|---|
| 6,123,325 | A * | 9/2000 | Buchanan | F16F 9/0454 267/122 |
| 6,422,543 | B1 | 7/2002 | Fejerdy | |
| 9,140,327 | B2 * | 9/2015 | Hart | B60G 17/0521 |
| 2007/0290461 | A1 * | 12/2007 | Oscarsson | B60G 11/28 280/6.15 |
| 2008/0177011 | A1 * | 7/2008 | Tamura | F16F 9/0409 525/471 |
| 2012/0153550 | A1 | 6/2012 | Sigirtmac et al. | |
| 2012/0205844 | A1 * | 8/2012 | Koeske | B60G 11/27 267/122 |
| 2013/0020746 | A1 * | 1/2013 | Agarwal | F16F 9/052 267/64.27 |
| 2013/0093132 | A1 * | 4/2013 | Street | B60G 11/27 267/122 |
| 2014/0061984 | A1 | 3/2014 | Hart et al. | |
| 2016/0332497 | A1 * | 11/2016 | Keeler | B60G 11/27 |
| 2017/0151848 | A1 * | 6/2017 | Delorenzis | F16F 9/0472 |
| 2017/0204928 | A1 * | 7/2017 | Dehlwes | F16F 9/0454 |
| 2017/0240020 | A1 * | 8/2017 | Delorenzis | B60G 17/052 |
| 2017/0241504 | A1 * | 8/2017 | Delorenzis | B60G 17/08 |
| 2018/0252288 | A1 * | 9/2018 | Brookes | F16F 9/05 |
| 2019/0126707 | A1 * | 5/2019 | Johansson | B60G 11/27 |
| 2020/0247206 | A1 * | 8/2020 | Brunsch | F16F 9/0481 |

FOREIGN PATENT DOCUMENTS

| | | |
|---|---|---|
| DE | 102009044627 A1 | 5/2011 |
| DE | 102011055351 A1 | 5/2013 |
| EP | 0510359 A2 | 10/1992 |
| FR | 2779197 A1 | 12/1999 |
| FR | 2820180 A1 | 8/2002 |
| GB | 1248025 A | 9/1971 |

* cited by examiner

AIR SUSPENSION ARRANGEMENT

BACKGROUND AND SUMMARY

The present invention relates to an air suspension arrangement for a vehicle. The invention also relates to a method for manufacturing an air suspension arrangement and a vehicle comprising such air suspension arrangement. The invention is applicable on vehicles, in particularly low, medium and heavy duty vehicles commonly referred to as trucks. Although the invention will mainly be described in relation to a truck, it may also be applicable for other type of vehicles such as e.g. working machines, cars, buses, etc.

In the field of vehicles, in particularly low-, medium- and heavy duty vehicles commonly referred to as trucks, air suspension arrangements are commonly mounted between the wheel axle and the vehicle chassis in order to absorb the vibrations caused by, for example, the road surface at which the vehicle is driving. A typical air suspension arrangement comprises a flexible bellows, or flex member, which is connected to the vehicle chassis, and a piston which is connected to the wheel axle. The chassis can be raised and lowered in relation to the wheel axle by means of inflating or deflating air into the space formed by the flexible bellows. The flexible bellows is thus arranged to roll up and down on the piston when inflating/deflating air therein.

Furthermore, the air suspension arrangement often comprises bumper stop arranged between the flexible bellows and the piston. The main purpose of the bumper stop is to act as a load carrying structure which directs the load from the chassis to the wheel axle in cases when air has been approximately completely drained from the flexible bellows. A further purpose of the bumper stop is to absorb dynamic loads that might occur when the vehicle, for example, is driving through a so-called pot hole in the road surface.

An example of an air suspension system comprising a flexible bellows, a piston and a bumper stop is given in US 2012/0153550. The bumper stop is connected to the piston by means of a connection bolt which is positioned in a connection apparatus of the bumper stop.

Although US 2012/0153550 describes a bumper stop that may function properly during operation, there is a need of reducing the number of components thereof in order to reduce the overall cost associated therewith.

It is desirable to provide an air suspension arrangement which at least partially overcomes the deficiencies of the prior art.

According to a first aspect of the present invention, there is provided an air suspension arrangement arranged to be connected between a vehicle axle and a vehicle chassis of a vehicle, the air suspension arrangement comprising a flexible bellows having an upper portion connectable to the vehicle chassis of the vehicle, and a bumper stop, wherein the air suspension arrangement further comprises a polymer member arranged between the bumper stop and the flexible bellows for connecting the bumper stop to the flexible bellows.

The wording "connected between" should not be interpreted as limiting the air suspension arrangement to be directly connected to the vehicle axle and the vehicle chassis. Rather, the air suspension arrangement may be arranged to be indirectly connected between the vehicle axle and the vehicle chassis via a bracket or the like. The main purpose of the air suspension arrangement is to be arranged between the vehicle axle and the vehicle chassis in order to absorb vibrations there between.

The vehicle axle is thus preferably a wheel axle of the vehicle, such as the front wheel axle or the rear wheel axle of the vehicle. The vehicle chassis should thus preferably be interpreted as vehicle frame components extending in the longitudinal direction of the vehicle.

A bumper stop should be understood to mean a device of the air suspension arrangement which main purpose is to act as a load carrying structure that directs the load from the chassis to wheel axle in cases when air has been approximately completely drained from the flexible bellows, or to absorb dynamic loads that the flexible bellows is unable to withstand and that occur during driving. The bumper stop may also commonly be referred to as a "bump stop" or "bumper", etc.

An advantage of providing a polymer member between the bumper stop and the flexible bellows is that fewer components are necessary for providing the air suspension arrangement. A reason for this is that the polymer member enables for a connection between the bumper stop and the flexible bellows, wherein the polymer member may be, as will be described further below, bonded to each of the bumper stop and the flexible bellows to provide a connection with sufficient strength there between. Hereby, the bumper stop and the flexible bellows together form an integral part by means of the polymer member.

A further advantage is that the process of manufacturing the air suspension arrangement is simplified. The manufacturing process is described in further detail below but can be mentioned in relation to the first aspect as well. By means of the polymer member, the manufacturing process can be arranged as a two step process, where the polymer member is bonded to one of the bumper stop and the flexible bellows in a first stage thereof. In a second stage, the polymer member is bonded to the other one of the bumper stop and the flexible bellows to form the air suspension arrangement.

Still further, the polymer member may also increase the stiffness of the air suspension arrangement. An air suspension arrangement, and in particularly the bumper stop, is commonly of a rubber material. A polymer member may thus provide an increased stiffness for the bumper stop.

According to an example embodiment, the air suspension arrangement may further comprise a piston having a lower portion connectable to the vehicle axle, wherein the flexible bellows and the piston are at least partly connected to each other.

Hereby, the bumper stop can be connected to the piston via the portion of the flexible bellows. Thus, when the air has been approximately completely drained from the flexible bellows of the air suspension arrangement, the load from the vehicle chassis is transmitted to the vehicle axle via the bumper stop and the piston. The bumper stop may also comprise a portion in direct connection to a portion of the piston, which is described further below.

According to an example embodiment, the polymer member may be a circumferentially arranged polymer ring connected between the bumper stop and the flexible bellows.

Hereby, an improved connection between the bumper stop and the polymer ring may be provided through the entire circumferential surface of the bumper stop connected to the flexible bellows.

According to an example embodiment, the bumper stop may comprise at least one through hole for fluidly connecting an interior space formed by the piston with a space formed by the flexible bellows.

The wording "fluidly connecting" should be understood to mean that air, or whichever gas is provided in the air suspension arrangement, can be provided between the space formed by the piston and the space formed by the flexible bellows. An advantage of at least one through hole is that the natural frequency of the air suspension arrangement can be kept relatively constant during operation, which will provide for a less bumpy behavior of the air suspension arrangement and hence an increased comfort for the vehicle operator.

According to an example embodiment, the piston may comprise a taper shaped surface, wherein the flexible bellows is at least partly connected to the piston at the taper shaped surface.

The taper shaped surface of the piston is formed such that a diameter of an upper portion of the piston, which upper portion of the piston is arranged to face the vehicle chassis when the air suspension arrangement is connected thereto, is smaller than a diameter of a lower portion of the piston. An advantage is that an increased stiffness is provided for the piston. Hereby, mechanical load from the bumper stop can be directed through the piston to the vehicle axle with reduced risk of buckle the piston. It may also be advantageous to further increase the stiffness of the piston at the upper portion thereof. This increased stiffness can be achieved by providing additional material to the piston at the upper surface, exposing the piston to an embossing operation, or to provide a folding to the piston at the upper portion thereof. It is also possible to provide a rib-like structure on an inner side of the tapered shape surface of the piston to increase the stiffness.

A further effect of the taper shaped surface of the piston is that the flexible bellows is arranged to be rolled up on the piston to a larger amount in comparison to the prior art. Hereby, an increased stroke of the air suspension arrangement is provided.

According to an example embodiment, at least a portion of the bumper stop may be directly connected to a portion of the piston.

According to an example embodiment, a lower portion of the bumper stop may extend into an opening of the piston, wherein an outer diameter of the lower portion of the bumper stop is larger than a diameter of the opening of the piston.

An advantage is that a snap connection may be provided between the bumper stop and the piston. Also, the snap connection prevents a relative axial movement of the bumper stop relative to the piston.

According to an example embodiment, the piston may comprise a supporting portion arranged at an upper portion of the piston, wherein the supporting portion comprises a plurality of vertically extending ribs arranged in the circumferential direction of the supporting portion.

Hereby, an alternative way of connecting the bumper stop and flexible bellows to the piston is provided.

According to an example embodiment, the bumper stop may comprise a taper shaped outer surface.

According to an example embodiment, the through hole of the bumper stop may have a convex shape, wherein a diameter of the opening facing the piston is smaller than an opening facing a space formed by the flexible bellows.

An advantage is that load from the vehicle chassis to the bumper stop will be provided to the bumper stop at an increased radial position of the bumper stop which may improve the load path through the bumper stop.

According to an example embodiment, the polymer member may comprise material properties for bonding to a rubber material. According to a non-limiting example, the polymer member may be provided from a plastic material provided from the brand names of Vestamid and Vestoran from a company named Evonik.

According to an example embodiment, the portion of the bumper stop connected to the polymer member may be made of a rubber material.

By providing a rubber material to the portions connected to the polymer member may enable for a bonding between the materials which beneficially connects the bumper stop to the polymer member.

According to an example embodiment, the rubber material of the bumper stop and the polymer member may be bonded to each other. The bonding between the bumper stop and the polymer member may be performed by cross-linkage of the materials which provides a sufficiently strong connection there between.

According to an example embodiment, the portion of the flexible bellows connected to the polymer member may be made of a rubber material. According to a non-limiting example, the rubber material may be a natural rubber or a Chloroprene rubber, etc.

According to an example embodiment, the rubber material of the flexible bellows and the polymer member may be bonded to each other. The bonding between the bumper stop and the polymer member may be performed by cross-linkage of the materials which provides a sufficiently strong connection there between.

Cross-link should be understood to mean that one polymer chain is linked to another. The cross-link may be provided by means of e.g. a vulcanization process.

According to an example embodiment, the piston may be made of a plastic material.

According to a second aspect of the present invention, there is provided a method for manufacturing an air suspension arrangement comprising the steps of: bonding a polymer member to one of a bumper stop and a flexible bellows to form a bonded connection there between; bonding the polymer member to the other one of the bumper stop and the flexible bellows to form a bonded connection there between; and connecting the flexible bellows to a taper shaped surface of a piston arranged to be connected to a vehicle axle.

The step of bonding the parts to each other may be performed by vulcanization. Hereby, a polymer member that provides a good bonding with rubber materials is introduced between the bumper stop and the flexible bellows.

An advantage is that a simplified process for manufacturing the air suspension arrangement is provided. In more detail, the manufacturing can in two steps provide a sufficiently strong connection between the flexible bellows and the bumper stop. Thus, by means of the manufacturing method, a sufficiently strong cross-link connection is provided between the bumper stop and the polymer member, and between the flexible bellows and the polymer member.

Normally, when vulcanizing one material to another, there are no possibilities of providing a further vulcanization process to that material combination. However, the inventors of the present invention have unexpectedly realized that by using a polymer member, the vulcanization process can be performed in two steps. In the first step, the polymer member and one of the flexible bellows and the bumper stop are exposed to a vulcanization process. Thereafter, in the second step, the polymer member and the other one of the flexible bellows and the bumper stop are exposed to a vulcanization process.

Further effects and features of the second aspect are largely analogous to those described above in relation to the first aspect.

According to a third aspect of third aspect of the present invention, there is provided vehicle comprising a vehicle axle, a vehicle chassis and an air suspension arrangement according to any of the example embodiments described above in relation to the first aspect of the present invention, wherein the air suspension arrangement is connected between the vehicle axle and the vehicle chassis.

Effects and features of the third aspect are largely analogous to those described above in relation to the first and second aspects of the present invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION

Figure 1:
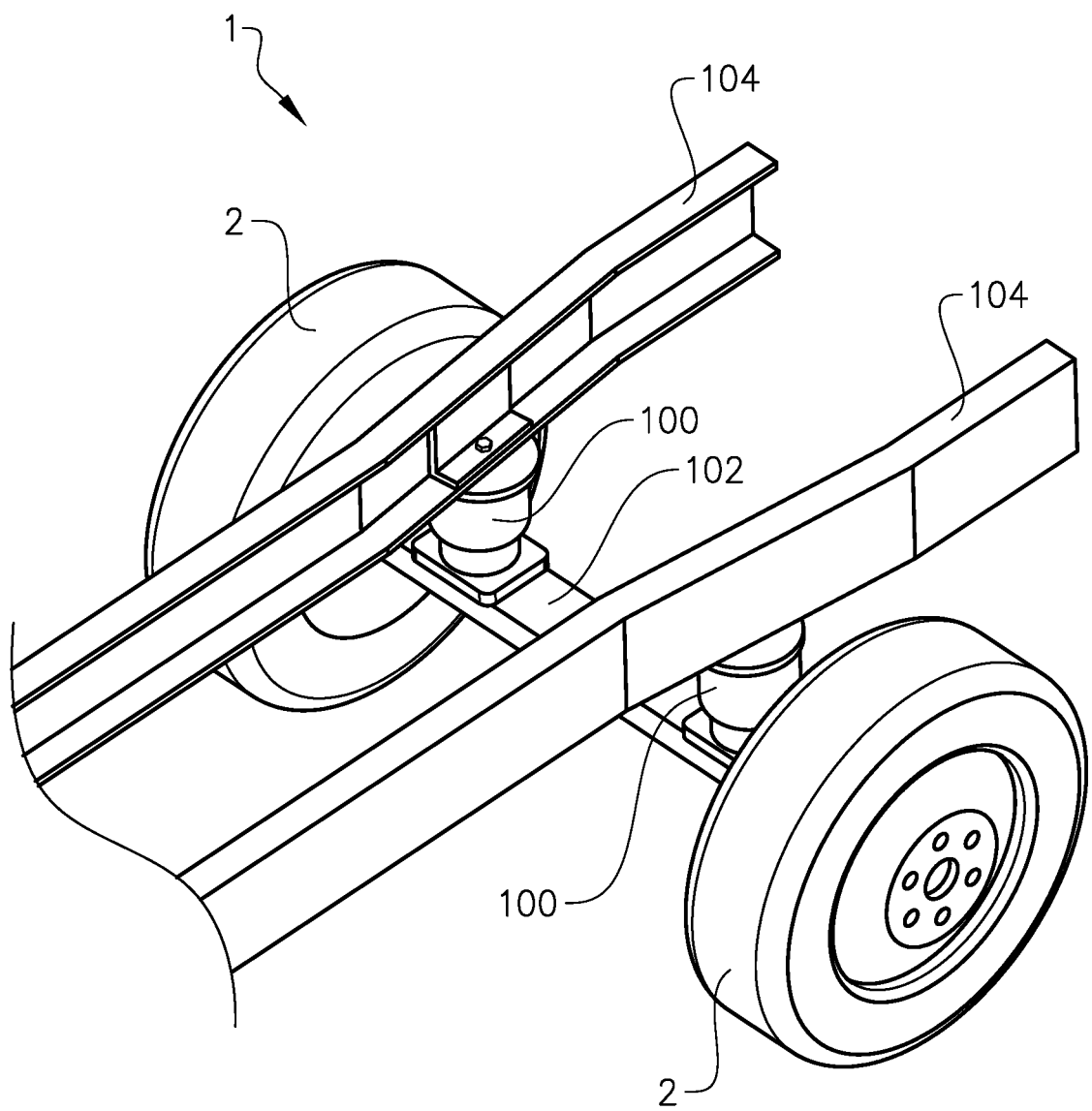
FIG. 1 is a perspective view of a front portion of a vehicle illustrating the air suspension arrangement positioned between a vehicle axle and a vehicle chassis.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, a portion of a vehicle 1 in the form of a truck is illustrated. In detail, FIG. 1 illustrates the front wheels 2 of the vehicle 1 which are supported by a vehicle axle 102. The vehicle 1 further comprises a vehicle chassis 104 extending approximately in the longitudinal direction of the vehicle 1. As can be seen in FIG. 1, the vehicle chassis 104 is arranged on each side of the vehicle 1 as seen in the longitudinal direction thereof.

Furthermore, a respective air suspension arrangement 100 is provided between the vehicle axle 102 and the vehicle chassis 104 on each side of the vehicle axle 102. The air suspension arrangements 100 are configured to absorbed loads arising from the vehicle axle 102 during driving of the vehicle 1. Also, the air suspension arrangements 100 can be used for controlling the height of the vehicle chassis 104 above ground level. Hereby, the vehicle chassis 104 can be raised and lowered in relation to the vehicle axle 102 by means of the air suspension arrangements 100. This is executed by adding or draining air to/from the air suspension arrangements 100.

Figure 2A:
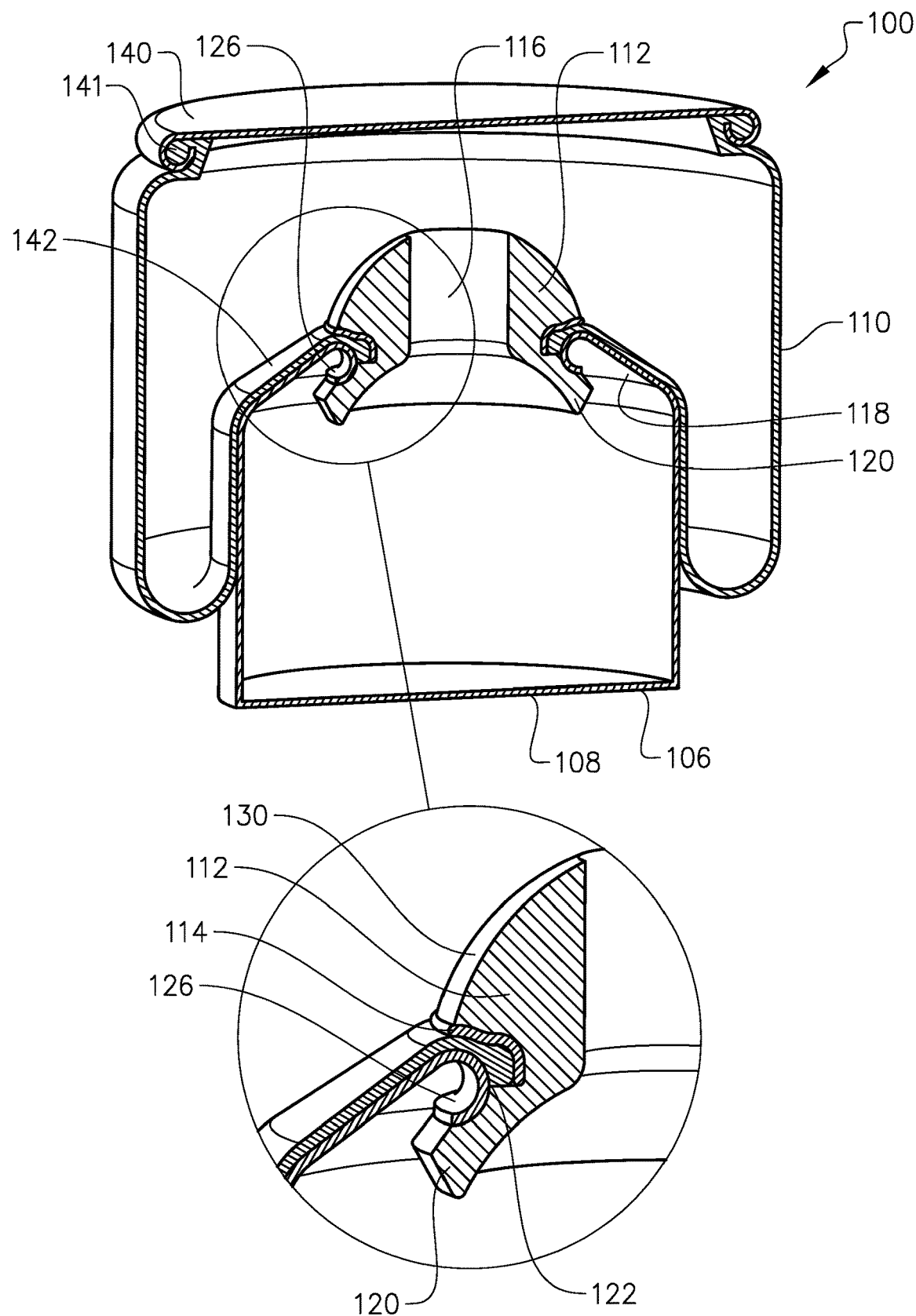
FIG. 2a is a perspective view of a cross-section, including a detailed illustration of the interconnection between the flexible bellows and the bumper stop, of the air suspension arrangement according to an example embodiment.
Figure 2B:
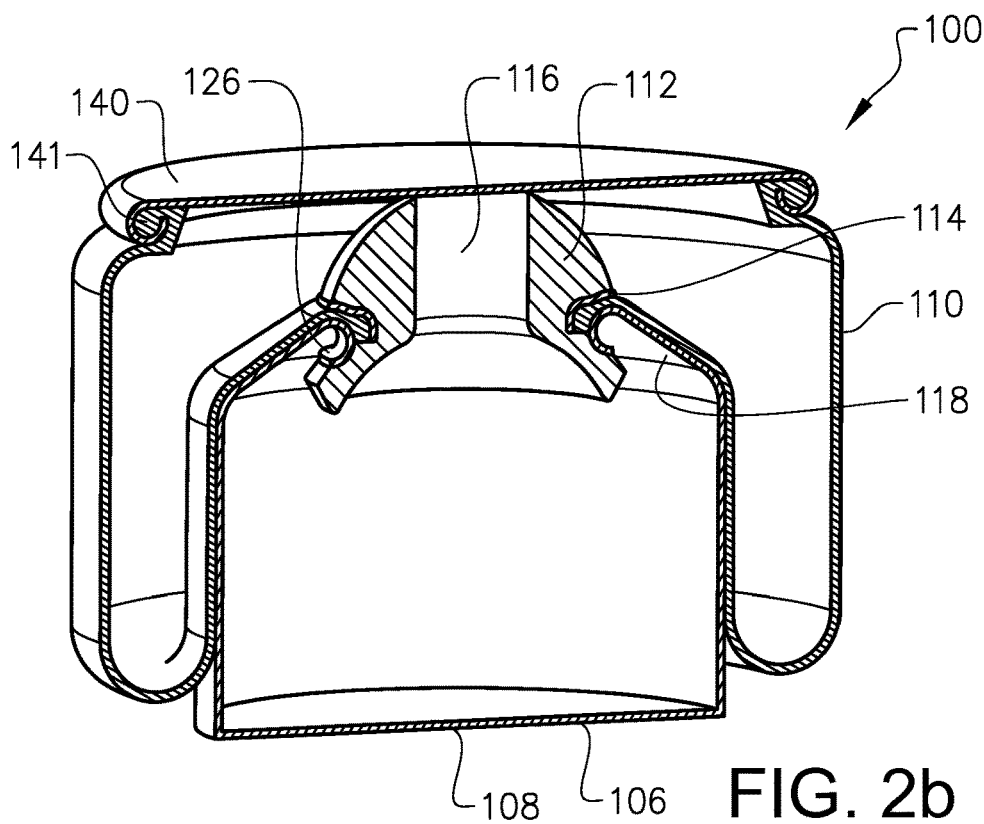
FIG. 2b is a perspective view of the cross-section of the air suspension arrangement in FIG. 2a in a deflated position.

In order to describe the air suspension arrangement 100 in further detail, reference is made to FIGS. 2a and 2b which illustrate the air suspension arrangement 100 in an at least partly inflated state and in a deflated state, respectively.

Firstly, reference is made to FIG. 2a. The air suspension arrangement 100 is, as described above, at least partly inflated with air in order to be able to absorb loads between the vehicle axle 102 and the vehicle chassis 104. More particularly, the air suspension arrangement 100 comprises a piston 106 having a lower portion 108 which is connected to the vehicle axle 102. The lower portion 108 of the piston 106 may be either directly connected to the vehicle axle 102 by means of a suitable fixation arrangement (not shown), or indirectly connected to the vehicle axle 102 via, for example, a bracket or the like (not shown). In the example embodiment depicted in FIG. 2a, the piston has a taper shaped surface 118 at an upper portion thereof, wherein the upper portion is facing away from the lower portion 108 of the piston and comprises an opening 122, or through hole, at its upper portion of the taper shaped surface 118. The lower portion 108 on the other hand is generally circular in shape.

The air suspension arrangement 100 further comprises a flexible bellows 110. The flexible bellows 110 has an open structure at an upper portion 141 thereof at which a plate structure 140, or the like, is connected. The plate structure 140 may either be directly connected to the vehicle chassis 104 via a suitable fixation arrangement (not shown), or indirectly connected to the vehicle chassis 104 via, for example, a bracket or the like (not shown). The flexible bellows 110 is the movable portion of the air suspension arrangement 100 and is thus preferably made of a rubber material to be able to move up/down on the surface of the piston 106, i.e. the flexible bellows is "rolling" on the surface of the piston 106. Hence, when inflating air to the air suspension arrangement 100, i.e. into the volume formed by the flexible bellows 110, the plate structure 140 is moved in a direction away from the piston 106 such that the vehicle chassis 104 is raised in relation to the vehicle axle 102. Likewise, when air is deflated from the air suspension arrangement 100, the plate structure 140 is moved in a direction towards the piston 106 such that the vehicle chassis 104 is lowered in relation to the vehicle axle 102. If a sufficient amount of air is deflated from the air suspension arrangement 100 it can be said that the air suspension arrangement is collapsed, which state is depicted and described further in relation to FIG. 2b below.

Moreover, portions of the flexible bellows 110 are arranged in contact with the piston 106. In particular, a portion of the flexible bellows 110 is arranged in contact with the taper shaped surface 118 of the piston 106. Hence, the flexible bellows 110 also comprises a taper shaped surface 142 which is arranged in contact with the taper shaped surface 118 of the piston 106. Accordingly, the flexible bellows is releasably connected to the piston 106 at the taper shaped surface 118.

Furthermore, the air suspension arrangement 100 comprises a bumper stop 112. The functionality of the bumper stop 112 will be described in further detail below in relation to the description of FIG. 2b. According to the embodiment depicted in FIG. 2a, the bumper stop 112 is positioned in an opening of the piston 106 and the flexible bellows 110 and provided with a through hole 116 for allowing air to be transferred between the piston 106 and the flexible bellows 110. The bumper stop 112 connects the flexible bellows 110 to the piston 106. Still further, the bumper stop 112 comprises a lower portion 120 facing the piston 106. The lower portion 120 of the bumper stop 112 is substantially circular in cross-section and has an outer diameter which is larger than a diameter of the opening 122 of the piston 106 and an opening of the flexible bellows 110. Hereby, a press-fit between the bumper stop 112 and the piston 106 is provided. Still further, the bumper stop 112 comprises a taper shaped outer surface 130 facing the interior of the flexible bellows 110.

Now, reference is especially made to the cut-out view of FIG. 2a illustrating details of the interface between the upper portion 126 of the piston 106, the flexible bellows 110 and the bumper stop 112. As can be seen in the cut-out view of FIG. 2a, the air suspension arrangement 100 comprises a polymer member 114. The polymer member 114 is arranged between the flexible bellows 110 and the bumper stop 112, thus connecting the flexible bellows 110 to the bumper stop 112. The polymer member 114 is in the illustrated embodiment of FIG. 2a a circumferentially arranged polymer member 114 being in continuous contact with the bumper stop 112 and the flexible bellows 110 in the circumferential direction thereof. Still further, the polymer member 114 is preferably connected to each of the bumper stop 112 and the flexible bellows 110 by means of a respective bonding process which will be described in further detail below in connection to the description of FIG. 5.

Thus, by means of the polymer member 114, the bumper stop 112 is sufficiently bonded to the flexible bellows 110, which in turn is connected to the piston 106.

Reference is now made to FIG. 2b which illustrates the air suspension arrangement 100 of FIG. 2a in a collapsible, or at least partially deflated, state. Thus, the illustration in FIG. 2b is intended to depict the air suspension arrangement 100 after being drained from air such that the vertical distance between the vehicle axle 102 and the vehicle chassis 104 is minimized. In this state, the plate structure 140 is arranged in abutment with the bumper stop 112. Hereby, the load from the vehicle chassis 104 is transferred to the vehicle axle 102 via the bumper stop 112 and the piston 106. The bumper stop 112 is thus a load carrying structure adapted to, in combination with the piston 106, carry load from vehicle chassis 104.

Figure 3:
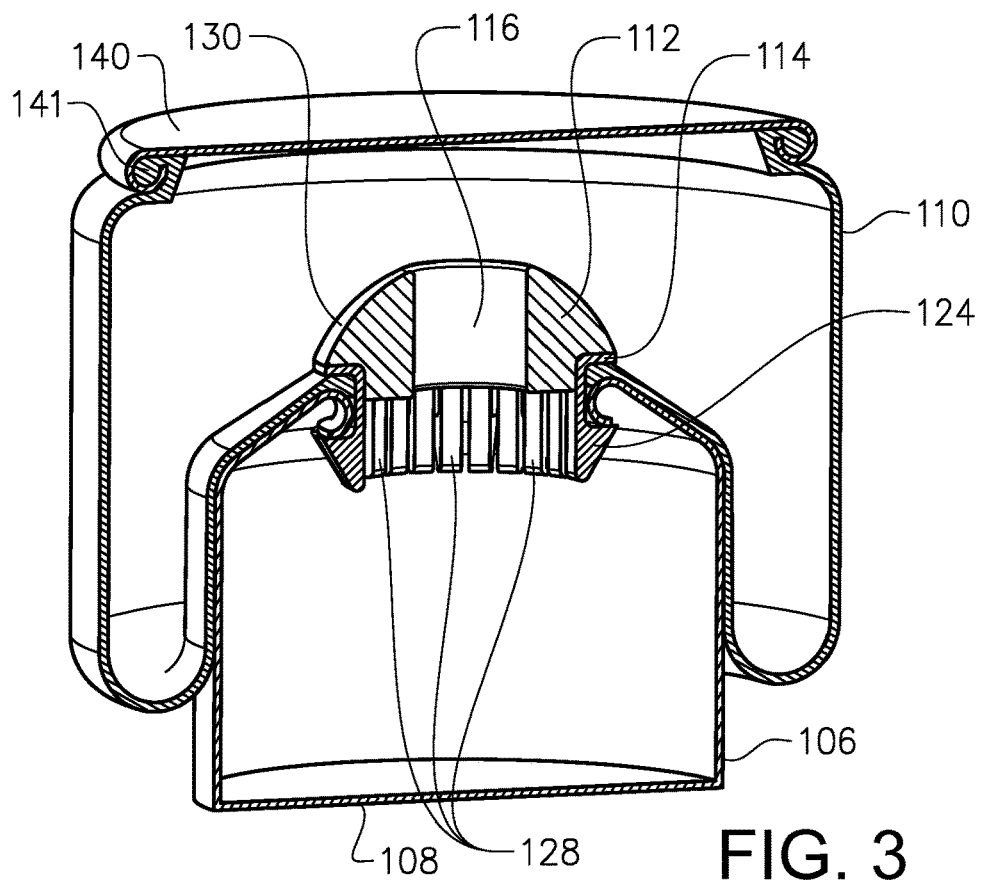
FIG. 3 is a perspective view of a cross-section of an air suspension according to another example embodiment.

Turning to FIG. 3, another example embodiment of the air suspension 100 arrangement is depicted. Generally, the flexible bellows 110 is quite similar to the embodiment depicted in FIGS. 2a and 2b. However, the bumper stop 112 does not comprise the lower portion 120 with a larger diameter than the opening 122 of the piston 106 as described above in relation to FIG. 2a. Instead, the piston 106 comprises a supporting portion 124 in the form of circumferentially arranged ribs 128. The ribs 128 extend in the vertical direction of the air suspension arrangement 100 from the opening of the piston 106 and towards the lower portion 108 of the piston 106. An outer diameter of the circumferentially arranged ribs 128 is larger than the diameter of the opening of the piston in a similar manner as for the lower portion 120 of the bumper stop 112 as described above. Hereby, the ribs 128 provide a locking function of the bumper stop 112 and flexible bellows 110 towards the piston 106.

Figure 4:
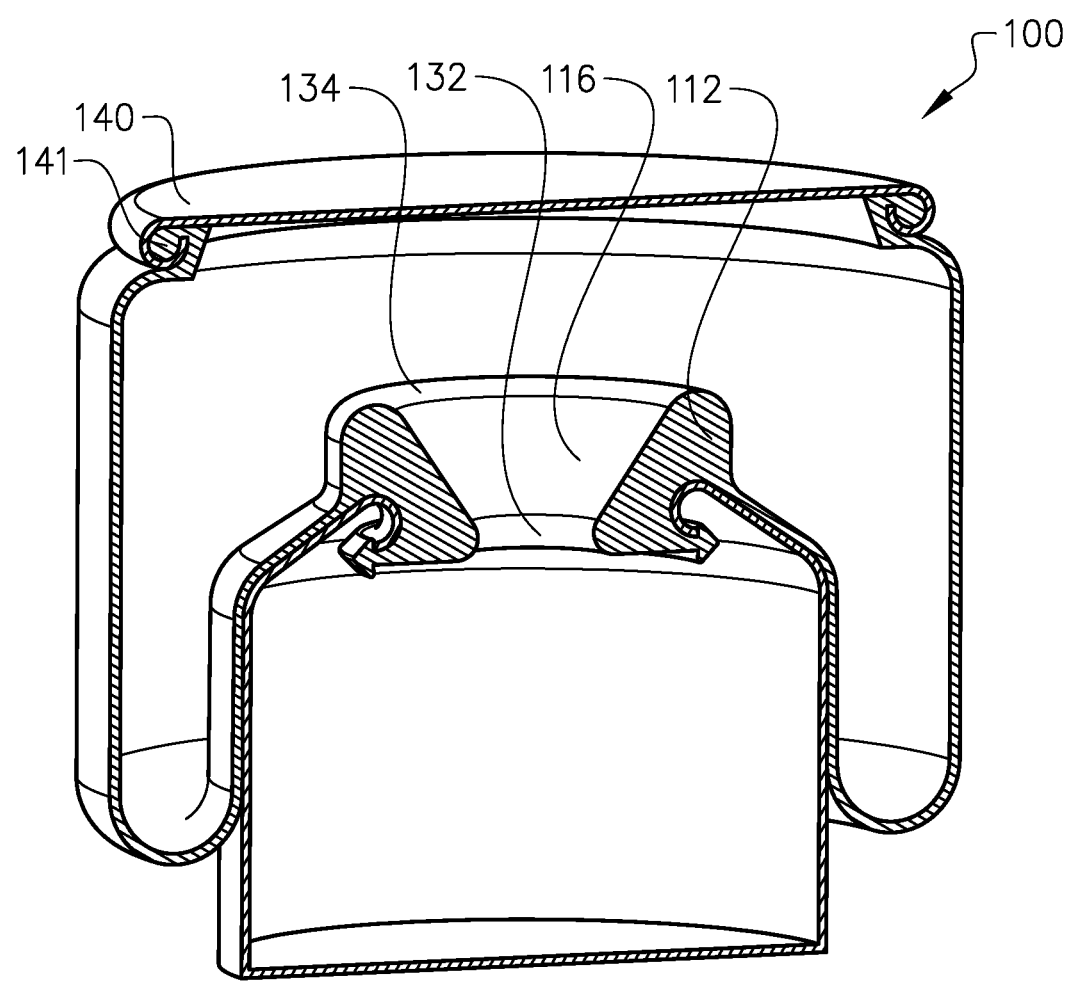
FIG. 4 is a perspective view of a cross-section of an alternative configuration of the bumper stop according to another example embodiment.

Reference is now made to FIG. 4 which illustrates a still further example embodiment of the air suspension arrangement 100. The difference between the air suspension arrangement 100 in FIG. 4 and the air suspension arrangement 100 depicted in FIGS. 2a and 3 is mainly directed to the through hole 116 of the bumper stop 112. The through hole 116 of the bumper stop 116 in the previous configuration was a relatively straight hole having approximately the same diameter at an upper portion facing the flexible bellows 110 as a lower portion facing the piston 106. The through hole 116 in the bumper stop 112 depicted in FIG. 4 on the other hand has an opening 132 facing the piston 106 which is smaller than an opening 134 facing the space formed by the flexible bellows 110. Hence, the through hole 116 has a substantially convex shape. The shape of the through hole 116 enables for an increased diameter of the opening 134 facing the space formed by the flexible bellows 110 which may be beneficial from a load carrying perspective when the load from the vehicle chassis 104 is transferred to the vehicle axle 102 through the bumper stop 112 and the piston 106.

Figure 5:
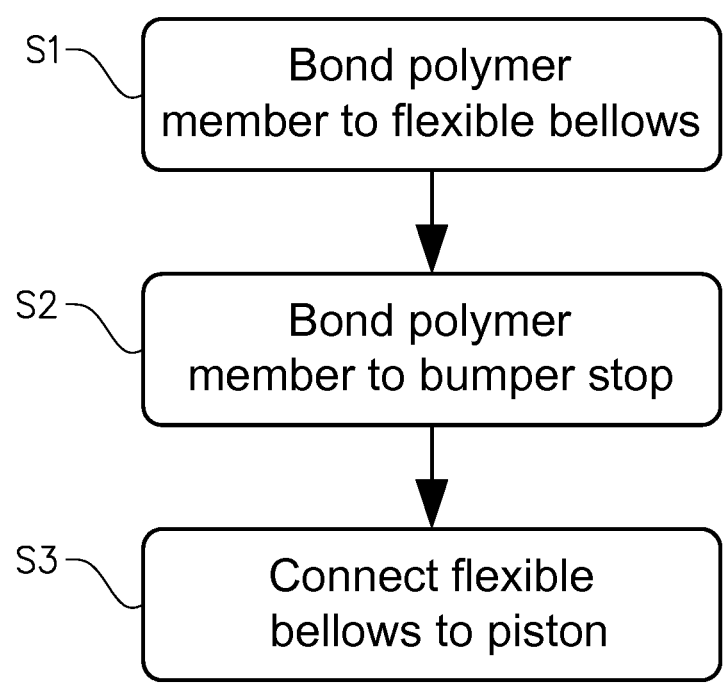
FIG. 5 is a flow chart of a method for manufacturing an air suspension arrangement according to an example embodiment.

Finally, reference is made to FIG. 5 which illustrates a flow chart of a method for manufacturing the air suspension arrangement 100 according to an example embodiment. According to a first step, the above described flexible bellows 110 is bonded S1 to the polymer member 114 at the vulcanization of a surface of the flexible bellows 110. Thereafter, the bumper stop 112 is bonded S2 to the polymer member 114 at the vulcanization of a portion of the bumper stop 112. Hereby, an assembly containing the bumper stop 112, the polymer member 114 and the flexible bellows 110 is provided. The assembly is thereafter provided to the piston by means of connecting S3 the flexible bellows to the piston 106.

It should be readily understood that the method may equally as well be executed by bonding the polymer member 114 to the bumper stop 112 in the first step and thereafter bonding the polymer member 114 to the flexible bellows 110.

A variety of methods for executing vulcanization are available and the skilled person of vulcanization is well aware of the different options at hand and understands from the above disclosure how to perform the different method steps.

It is to be understood that the present invention is not limited to the embodiment described above and illustrated in the drawings; rather, the skilled person will recognize that many changes and modifications may be made within the scope of the appended claims. For example, instead of a single through hole 116 in the bumper stop 112, a plurality of vertically extending through holes may be arranged for allowing air to be transferred between the piston 106 and the flexible bellows 110.

The invention claimed is:

1. An air suspension arrangement arranged to be connected between a vehicle axle and a vehicle chassis of a vehicle, the air suspension arrangement comprising a flexible bellows having an upper portion connectable to the vehicle chassis of the vehicle, and a bumper stop wherein the air suspension arrangement further comprises a polymer member arranged between the bumper stop and the flexible bellows for connecting the bumper stop to the flexible bellows, wherein the polymer member is vulcanized bonded to each of the bumper stop and the flexible bellows.

2. The air suspension arrangement according to claim 1, wherein the polymer member is a circumferentially arranged polymer ring connected between the bumper stop and the flexible bellows.

3. The air suspension arrangement according to claim 1, wherein the bumper stop comprises a taper shaped outer surface.

4. The air suspension arrangement according to claim 1, wherein a through hole of the bumper stop has a convex shape, wherein a diameter of an opening facing the piston is smaller than an opening facing a space formed by the flexible bellows.

5. The air suspension arrangement according to claim 1, wherein the polymer member comprises material properties for bonding to a rubber material.

6. The air suspension arrangement according to claim 1, wherein a portion of the bumper stop connected to the polymer member is made of a rubber material.

7. The air suspension arrangement according to claim 1, wherein the portion of the flexible bellows connected to the polymer member is made of a rubber material.

8. A vehicle comprising a vehicle axle, a vehicle chassis, and an air suspension arrangement according to claim 1, wherein the air suspension arrangement is connected between the vehicle axle and the vehicle chassis.

9. The air suspension arrangement according to claim 1, further comprising a piston having a lower portion connectable to the vehicle axle wherein the flexible bellows and the piston are at least partly connected to each other.

10. The air suspension arrangement according to claim 9, wherein the bumper stop comprises at least one through hole for fluidly connecting an interior space formed by the piston with a space formed by the flexible bellows.

11. The air suspension arrangement according to claim 9, wherein the piston comprises a taper shaped surface, wherein the flexible bellows is at least partly connected to the piston at the taper shaped surface.

12. The air suspension arrangement according to claim 9, further comprising a supporting portion arranged at an upper portion of the piston, wherein the supporting portion comprises a plurality of vertically extending ribs arranged in the circumferential direction of the supporting portion.

13. The air suspension arrangement according to claim 9, wherein the piston is made of plastic material.

14. The air suspension arrangement according to claim 9, wherein at least a portion of the bumper stop is directly connected to a portion of the piston.

15. The air suspension arrangement according to claim 14, wherein a lower portion of the bumper stop extends into an opening of the piston, wherein an outer diameter of the lower portion of the bumper stop is larger than a diameter of the opening of the piston.

16. A method for manufacturing an air suspension arrangement comprising the steps of:
   vulcanized bonding a polymer member to one of a bumper stop and a flexible bellows to form a vulcanized bonded connection therebetween;
   vulcanized bonding the polymer member to the other one of the bumper stop and the flexible bellows to form a vulcanized bonded connection therebetween; and
   connecting the flexible bellows to a taper shaped surface of a piston arranged to be connected to a vehicle axle.

* * * * *